(12) United States Patent
Brown (10) Patent No.: US 10,159,613 B2
(45) Date of Patent: Dec. 25, 2018

(54) VEHICLE, DEVICE AND METHOD FOR LOADING A VEHICLE

(71) Applicant: Advanced Vehicle Concepts Limited, Luton, Bedfordshire (GB)

(72) Inventor: Fredrick Brown, Sandridge (GB)

(73) Assignee: Advanced Vehicle Concepts Limited, Luton Bedfordshire (GB)

( * ) Notice: Subject to any disclaimer, the term of this patent is extended or adjusted under 35 U.S.C. 154(b) by 269 days.

(21) Appl. No.: 15/023,328

(22) PCT Filed: Sep. 19, 2014

(86) PCT No.: PCT/GB2014/052857
§ 371 (c)(1),
(2) Date: Mar. 18, 2016

(87) PCT Pub. No.: WO2015/040416
PCT Pub. Date: Mar. 26, 2015

(65) Prior Publication Data
US 2016/0220430 A1    Aug. 4, 2016

(30) Foreign Application Priority Data

Sep. 20, 2013 (GB) .................................. 1316703.6

(51) Int. Cl.
*B60P 1/43* (2006.01)
*A61G 3/06* (2006.01)
(Continued)

(52) U.S. Cl.
CPC ............. *A61G 3/061* (2013.01); *A61G 3/067* (2016.11); *A61G 5/04* (2013.01); *A61G 5/08* (2013.01); *B60P 1/431* (2013.01)

(58) Field of Classification Search
CPC .................................. A61G 3/061; B60P 1/431
See application file for complete search history.

(56) References Cited

U.S. PATENT DOCUMENTS

| 4,655,671 A | * | 4/1987 | Pratt | B60P 1/431 |
| | | | | 414/477 |
| 4,771,839 A | * | 9/1988 | Misawa | A61G 5/061 |
| | | | | 180/8.2 |

(Continued)

FOREIGN PATENT DOCUMENTS

| EP | 041840 | 3/1991 |
| EP | 2128009 | 12/2009 |

(Continued)

*Primary Examiner* — Jonathan Snelting
(74) *Attorney, Agent, or Firm* — Stetina Brunda Garred & Brucker (57) ABSTRACT

A device (1) for loading a vehicle (50) includes a platform for positioning inside the larger vehicle, a ramp having a sidewall, and a bridging member connectable between the platform and ramp, wherein the bridging member and ramp are configured to move to a deployed position in which the bridging member extends between the platform and the ramp such that the bridging member and platform are substantially coplanar, and the ramp extends at an angle from the bridging member. A mobility vehicle includes a body having a floor, wherein the floor has an upper side and a ground-facing side, at least one front wheel and a plurality of rear wheels, and a guide (53) attachable to the body and movable away from the floor to a deployed position on the ground-facing side of the floor. The mobility vehicle may ascend the ramp of the device and the guide contacts the sidewall and lifts the at least one front wheel off the floor of the device.

6 Claims, 13 Drawing Sheets

(51) Int. Cl.
*A61G 5/04* (2013.01)
*A61G 5/08* (2006.01)

(56) References Cited

U.S. PATENT DOCUMENTS

| | | | |
|---|---|---|---|
| 5,331,701 A * | 7/1994 | Chase | A61G 3/061 |
| | | | 14/71.1 |
| 5,649,803 A * | 7/1997 | Bennett | B60P 1/43 |
| | | | 414/537 |
| 5,730,577 A | 3/1998 | Jones | |
| 5,795,125 A | 8/1998 | Walkden | |
| 6,106,215 A * | 8/2000 | Goulet | B60P 3/122 |
| | | | 414/500 |
| 7,309,202 B1 | 12/2007 | Anderson | |
| 2002/0051703 A1 | 5/2002 | Clary | |
| 2007/0237614 A1 | 10/2007 | Johnson | |
| 2009/0108614 A1 | 4/2009 | Washington | |

FOREIGN PATENT DOCUMENTS

| | | |
|---|---|---|
| GB | 2274264 | 7/1994 |
| GB | 2447384 | 9/2008 |
| GB | 2455764 | 6/2009 |
| GB | 2491112 | 11/2012 |

* cited by examiner

PRIOR ART

Figure 1

PRIOR ART

Figure 2

PRIOR ART

VEHICLE, DEVICE AND METHOD FOR LOADING A VEHICLE

CROSS-REFERENCE TO RELATED APPLICATIONS

The present application claims priority to PCT International Application No. PCT/GB2014/052857 filed on Sep. 19, 2014, which claims priority to British Patent Application No. GB1316703.6 filed Sep. 20, 2013, the entirety of the disclosures of which are expressly incorporated herein by reference.

STATEMENT RE: FEDERALLY SPONSORED RESEARCH/DEVELOPMENT

Not Applicable

BACKGROUND

This invention relates to a vehicle, device and method for loading a vehicle. More specifically, but not exclusively, this invention relates to a mobility scooter, device and method for loading a mobility scooter into a larger vehicle.

Mobility scooters are typically used by the elderly and infirm as a mode of transport. They axe usually powered by an electric motor and a battery, and therefore have a range limited by the power output of the motor and the capacity of the battery. The mobility scooter design is therefore a compromise between the weight and size of the scooter, and its potential range. The range of many mobility scooters is such that only local trips from the user's home are viable.

If the user wants to take his/her mobility scooter to a destination which is outside the range of the mobility scooter, then he/she must transport the mobility scooter to the destination. As mobility scooter users are often elderly or infirm, the process of transporting the mobility scooter is problematic. One prior art device for solving this problem is a ramp.

Figure 1:
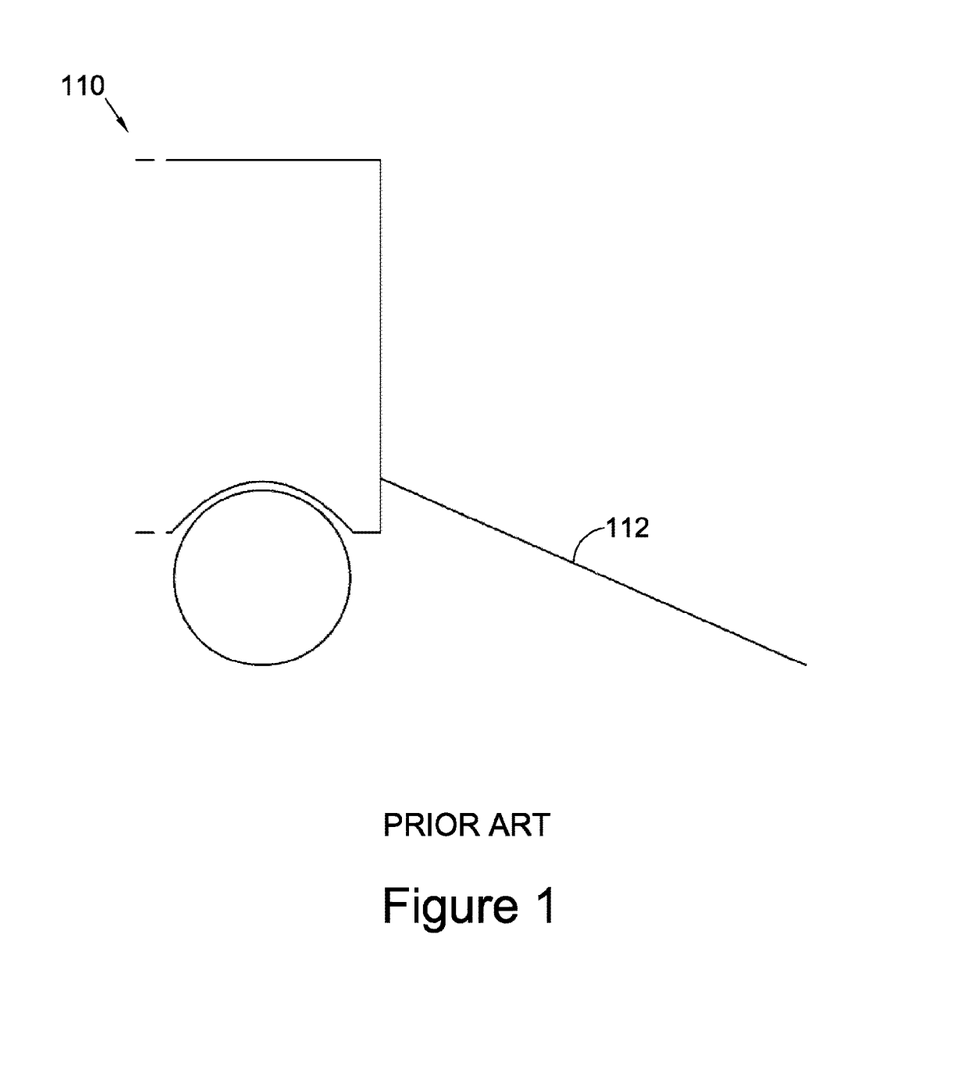
FIG. 1 illustrates a ramp of the prior art.

An example of a ramp 110 of the prior art is shown in FIG. 1. The ramp 110 includes two angled platforms 112, which extend from the rear of the vehicle to the ground such that a mobility scooter may drive up the angled platforms 112 into the rear of the vehicle.

There are problems with the ramp 110. The ramp 110 can be dangerous to use, as the angled platforms 112 must be aligned carefully for the mobility scooter to drive up safely. If the angled platforms 112 are misaligned, or if the angled platforms 112 slide off the rear of the vehicle, then the mobility scooter may fall to the ground, potentially causing serious damage to the mobility scooter and injury to the elderly or infirm person.

The ramps 110 are large to reduce the angle of the angled platforms 112. The size of the ramp 110 can therefore be difficult and cumbersome for the elderly or infirm to use, and can take up a lot of space inside the vehicle when not in use and stored in the vehicle.

Furthermore, as it is prohibited for the elderly or infirm person to ride the mobility scooter up the angled platforms 112, the person must stand to one side of the angled platforms 112 and operate the mobility scooter's accelerator. This is a difficult and dangerous operation, particularly as mobility scooters may accelerate very quickly when unloaded. Also, the mobility scooter may drive off the ramp if the steer angle is off-centre.

Clearly, the ramp was not an appropriate solution. Therefore, alternatives were developed, including a lift, a hoist, and a "take-apart" scooter.

Figure 2:
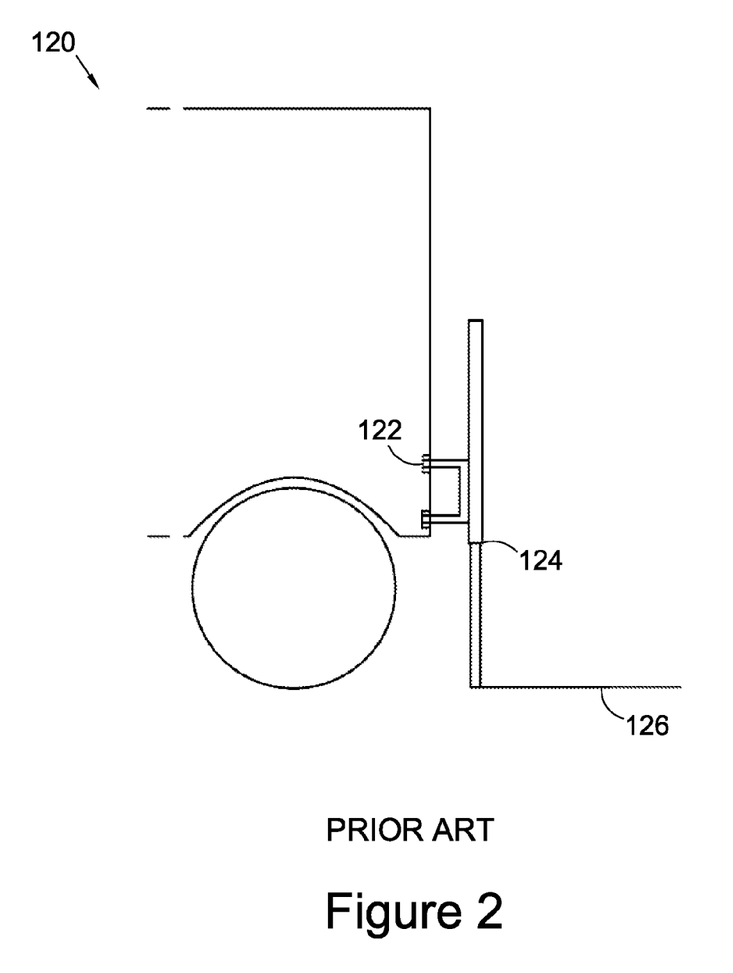
FIG. 2 illustrates a lift of the prior art.

The lift 120 is illustrated in FIG. 2. The lift 120, which is similar to a "tail lift" as used on a lorry, includes a fixing member 122, a pillar 124 and a platform 126. The platform 126 may be moved along an axis of the pillar 124. The lift 120 is fixed to the rear of a vehicle by the fixing member 122, which typically includes large bolts and steel plates such that the lift 120 is secured to the chassis of the vehicle.

In use, the platform 126 is lowered to the ground along the pillar 122 (achieved by an electric motor in the pillar 122), and the mobility scooter is driven onto the platform 126. The platform 126 is then raised off the ground.

The lift 120 may be adapted such that the platform 26 is rotatable between a stowed position, such that the platform 126 is parallel with the rear of a vehicle, and a deployed position, such that the platform 126 is parallel with the ground.

There are problems associated with the lift. When the lift 120 is in the stowed position, the platform 126 blocks the rear door from opening. This can prohibit access to, for example, the boot of a car, or the hack of a van. Also, when the mobility scooter is loaded on the deployed lift 120, the mobility scooter may become very dirty and wet in adverse weather conditions (this may also damage the mobility scooter's electronics). The scooter also has a tendency to bounce off the lift 120 if it is not secured, which is obviously dangerous.

The lift 120 also affects the weight distribution of the vehicle, and makes it difficult for the driver to park it.

Figure 3:
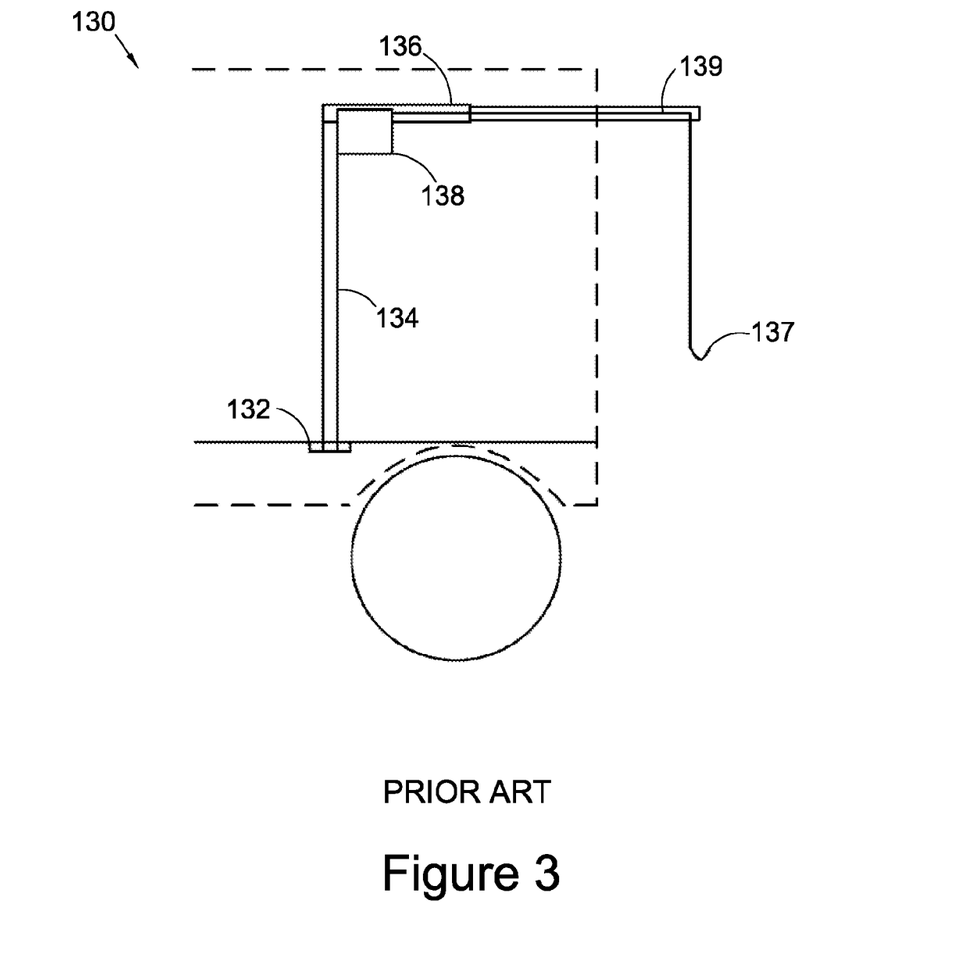
FIG. 3 illustrates a hoist of the prior art.

Another option is the hoist, illustrated in FIG. 3. The hoist 130 includes a fixing member 132, a mast 134, a boom 136, an attachment 137 and a winch 138. The winch 138 and the attachment 137 are connected through a cable 139, which runs alone the boom 136.

The hoist 130 is fixed to the interior of a vehicle via the fixing member 132, which typically includes large bolts and steel plates such that the hoist 130 is secured to a chassis of the vehicle. The attachment 137, such as a hook, is used to attach the mobility scooter to the hoist 130. The winch 138 then winds up the cable 139 such that the mobility scooter is lifted towards the boom 136.

The mobility scooter can then be moved into the vehicle. This can be achieved by having a retractable boom 136, such that the boom 136 can be retracted into the vehicle.

There are problems associated with the hoist. For example, if the vehicle is parked on a hill, then the mobility scooter will swing under gravity as it is lifted off the ground. This is obviously dangerous. Also, the hoist 130 is fixed to the inside of the vehicle, which takes up interior space. The hoist 130 can therefore decrease the boot space of a car.

There are problems associated with both the lift 120 and the hoist 130. The lift 120 and the hoist 130 use the vehicle as a counterbalance when lifting the mobility scooter. If the vehicle is small and/or light, it may experience a force when using the lift 120 or hoist 130 to move a vehicle causing the vehicle to tip. This is a health and safety risk, and can cause damage to the vehicle and/or mobility scooter.

The lift 120 and the hoist 130 are therefore normally used on larger vehicles, such as large vans or 4×4s, or when the mobility scooter is very light.

There are further problems associated with both the lift 120 and the hoist 130. The lift 120 and the hoist 130 require specialist fitting, as they normally require steel plates and large bolts to be fitted properly. This is expensive work, and requires the vehicle to be modified which reduces the second hand value of the vehicle.

Another option is a "take-apart" mobility scooter. The "take-apart" mobility scooter can be dissembled into its constituent parts, which are small enough to be lifted into a vehicle.

A first problem with the "take-apart" mobility scooter is that some of the constituent parts are heavy. For example, the part including the battery may have a mass of around 20 kg, which is very heavy for an elderly or infirm person. Furthermore, as the "take-apart" mobility scooter is designed to be as light as possible, they are relatively small and unsafe to drive, and the battery is typically smaller which reduces its range.

Furthermore, it is undesirable to spend a lot of time dissembling and assembling the "take-apart" mobility scooter outside the vehicle, for example when it is raining. It can also be difficult for some elderly or infirm people to dissemble or assemble the "take-apart" mobility scooter, for example, if they have arthritis.

All these solutions are clearly unsatisfactory. There has been a long-felt need in the industry for a device that safely and effectively loads a mobility scooter into a larger vehicle.

There are also further problems when a user of a mobility scooter wants to travel via aircraft. A user may transport their mobility scooter to the airport using one of the methods above, which is then loaded onto the plane. However, the user cannot take the adapted car or large ramps onto the aircraft with them, and so must rely on the rental car company at their destination having suitable cars and/or equipment for transporting their mobility scooter. This complication often deters mobility scooter users from international travel.

It is therefore desirable to alleviate some or all of the above problems.

BRIEF SUMMARY

According to a first aspect of the invention, there is provided a device for moving a mobility vehicle into a larger vehicle, comprising a platform for positioning inside the larger vehicle; a ramp having a sidewall; and a mobility vehicle including a guide which is movable such that it is lowered below the floor of the mobility vehicle body, the guide and sidewall being arranged to such that, as the mobility vehicle ascends the ramp, the front wheels are lifted off the ramp, and the guide steers the mobility vehicle up the ramp and into the larger vehicle.

The device may include a bridging member connectable between the platform and ramp, wherein the bridging member and ramp are configured to move to a deployed position in which the bridging member extends between the platform and the ramp such that the bridging member and platform are substantially coplanar, and the ramp extends at an angle from the bridging member. The device of the present invention includes a platform which may be positioned in the larger vehicle (e.g. a car), and the ramp and bridging member may extend out of a boot of the car (i.e. over the boot lip). The device may be positioned such that the bridging member extends over the boot lip such that the bridge and platform are substantially coplanar, and the ramp may extend downwardly to the ground. This allows the ramp to adopt a shallower gradient (compared to a gradient of a ramp extending between the ground and the platform, which would join the platform inside the boot). The skilled person will understand that the shallower gradient reduces the power required for a smaller vehicle (e.g. a mobility vehicle) to ascend the ramp, and allows the mobility vehicle to enter the car boot at a more acute angle (which reduces the chances of the mobility vehicle grounding and increases the range of larger vehicles the device may operate with, e.g. hatchbacks).

The device may also include a platform sidewalk bridging member sidewall and ramp sidewall, which may allow a smaller vehicle (e.g. a mobility vehicle of a second aspect of the invention) to ascend the ramp without grounding. In cooperation with a guide wheel on the scooter, the side-wall may help with alignment of the scooter as it travels along the ramp and/or bridging member.

The angle between the ramp and the bridging member is preferably less than or substantially equal to 30 degrees when in the deployed position. This further reduces the power required for a mobility vehicle to ascend the ramp. The ramp may also include a first and second ramp portion, having a telescopic connection. The skilled person will understand that the ramp may extend to its deployed position by extending the first and second ramp portion telescopically, whilst retaining a smaller volume when in its stowed configuration.

The bridging member and ramp may also be configured to move to a stowed position, in which the bridging member and ramp are stowed underneath the platform.

The device may further comprise an indicator of the angle between the ramp and the bridging member, and the indicator may differentiate between above and below 30 degrees (for example by a coloured indicator showing green for less than 30 degrees and red for more than 30 degrees). This helps users quickly determine if the device is set up safely.

The device may also include a central channel. The central channel may be suitable for receiving a central front wheel of a mobility vehicle. The platform, bridging member and ramp may also be provided in first and second rails (rather than a single piece), wherein each rail is for aligning with a first and second rear wheel of a mobility vehicle. The device may include first and second handles between the first and second rails and the central channel, which may aid moving the device between the stowed and deployed positions.

According to a second aspect of the invention, there is provided mobility vehicle comprising a body having a floor, wherein the floor has an upper side and a ground-facing side; at least one front wheel and a plurality of rear wheels; and a guide attachable to the body and movable away from the floor to a deployed position on the ground-facing side of the floor.

The mobility vehicle includes a guide which is movable such that it is lowered below the floor of the body. The guide may therefore be lowered such that it is positioned between the floor and the ground and such that it abuts the ramp sidewall as the mobility vehicle ascends the ramp. Accordingly, as the mobility vehicle ascends the ramp, the front wheels are lifted off the ramp, and the guide steers the mobility vehicle up the ramp and into the larger vehicle. This ensures the front wheels are not influencing the steer angle of the mobility vehicle, such that there is no risk of it being directed off the ramp.

The guide may be movable such that it is lowered below the floor of the body and between the first and second wheels. The skilled person will understand that the mobility vehicle adopts a pitch angle as it is ascends the ramp (wherein the pitch angle is defined by the contact points of the guide on the device's sidewalls and the rear wheel on the ground or ramp). By positioning the guide between the first and second wheels, the mobility vehicle maintains this pitch angle whilst the front portion of the vehicle enters the larger vehicle (as the pitch angle is maintained whilst the guide contacts the device's sidewalls). This reduces the likelihood of the mobility vehicle grounding as it ascends the device.

The mobility vehicle may further comprise a steering tiller including a control for driving the first or second wheels, wherein the control is disabled when the guide is lowered. In this arrangement, the mobility vehicle may be operated by other means, such as a remote control. This allows the user to operate the mobility vehicle and drive it up the ramp from a safe distance, rather than leaning over the ramp and using the mobility vehicle's controls. The mobility vehicle may be driven up the ramp at a predetermined speed. The predetermined speed may be set by the remote control to ensure the mobility vehicle is driven with adequate power to climb the ramp at a safe top speed. The torque developed by the drive motor may be automatically varied to maintain the predetermined speed across different operating conditions.

The steering tiller may be foldable, and the mobility vehicle may also comprise a foldable seat. These features reduce the size of the mobility vehicle such that it may be loaded into a wide range of larger vehicles.

The mobility vehicle may further comprise an anti-tip wheel positioned at the rear portion of the body, and the anti-tip wheel may be movable (e.g. raised) as the guide is lowered. This ensures that the anti-tip wheel does not contact the ground as the mobility vehicle ascends the ramp, which may affect the drive of the mobility vehicle.

According to a third aspect of the invention, there is provided a method of loading a mobility vehicle into a larger vehicle, the mobility vehicle comprising a body having a floor, wherein the floor has an upper side and a ground-facing side; at least one front wheel and a plurality of rear wheels; and a guide attachable to the body and movable away from the floor to a deployed position on the ground-facing of the floor, the method comprising the steps of deploying a ramp between an opening in the larger vehicle and the ground, the ramp including a floor and a sidewall; moving the guide to the deployed position; aligning the mobility vehicle with the ramp such that the guide aligns with the sidewall; and moving the mobility vehicle up the ramp, wherein the guide abuts the sidewall and lifts the at least one front wheel off the floor.

The step of moving the first vehicle up the ramp may include using a remote control to drive the first vehicle.

The mobility vehicle may further include a foldable steering tiller and a foldable seat, and the method may further comprise the step of folding the steering tiller and seat.

The step of moving the mobility vehicle may include moving the mobility vehicle up the ramp onto a platform. Furthermore, the method may further comprise the step of stowing the ramp underneath the platform.

BRIEF DESCRIPTION OF THE DRAWINGS

Embodiments of the invention will now be described, by way of example, and with reference to the drawings in which.

DETAILED DESCRIPTION

Figure 4:
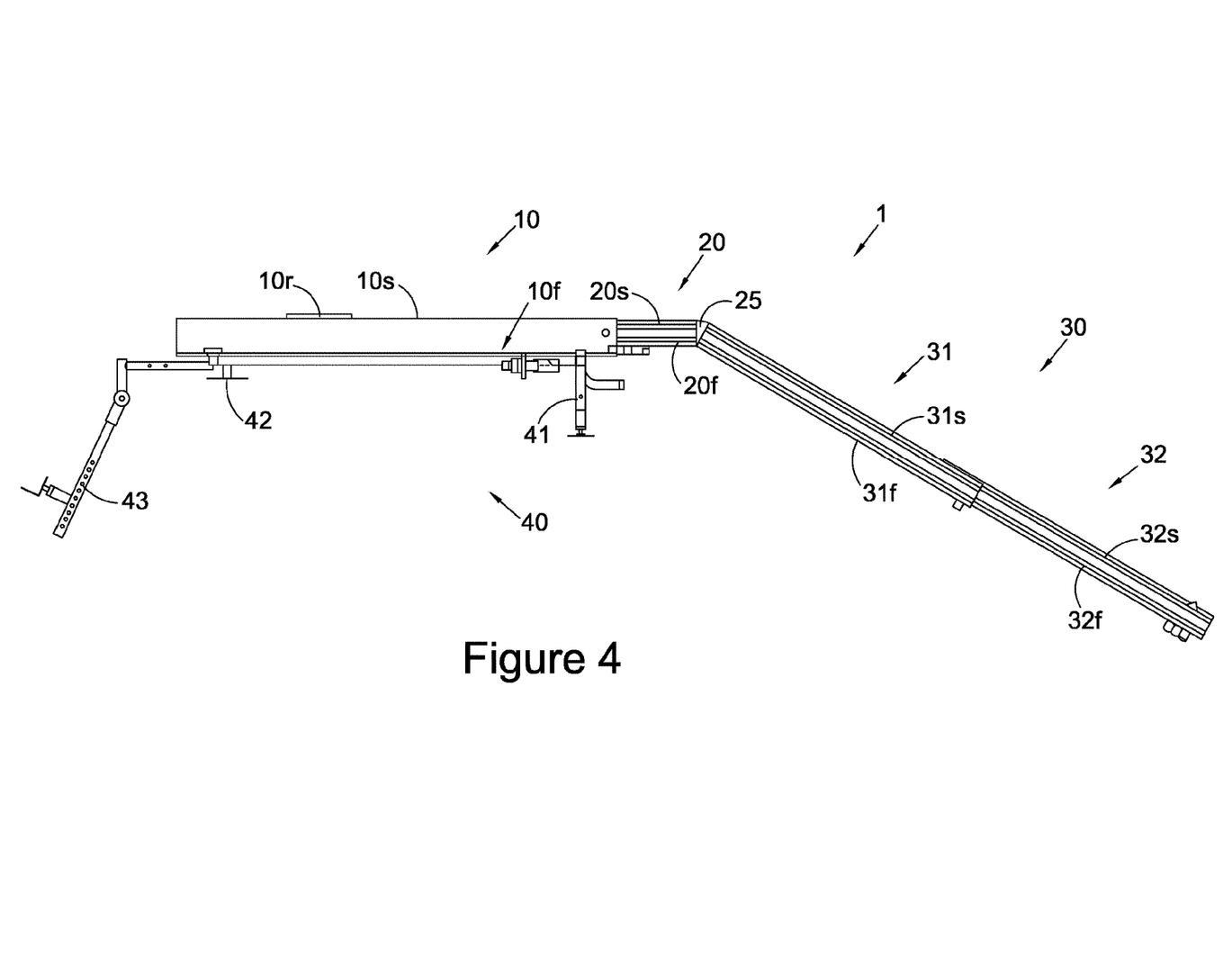
FIG. 4 is a side view of an embodiment of a device of the present invention, the device in an extended state.

An embodiment of a device of the present invention will now be described with reference to FIGS. 4 and 6. FIG. 4 illustrates a device 1 in an extended state. The device 1 includes a platform 10, a bridge 20 and a ramp 30. The platform 10 is configured to be fitted into a larger vehicle via a fitting mechanism 40 (explained in more detail below) such that the bridge 20 and ramp 30 may extend out of an opening (e.g. fitted to the rear of a car such that the bridge 20 and ramp 30 extend out of the boot). In this extended configuration, the bridge 20 extends from a first end of the platform 10 such that it is generally coplanar with the platform 10, and the ramp 30 extends downwardly from the bridge 20 to the ground. In this embodiment, the angle between the bridge 20 and the ramp 30 is between 20 and 30 degrees.

Figure 5:
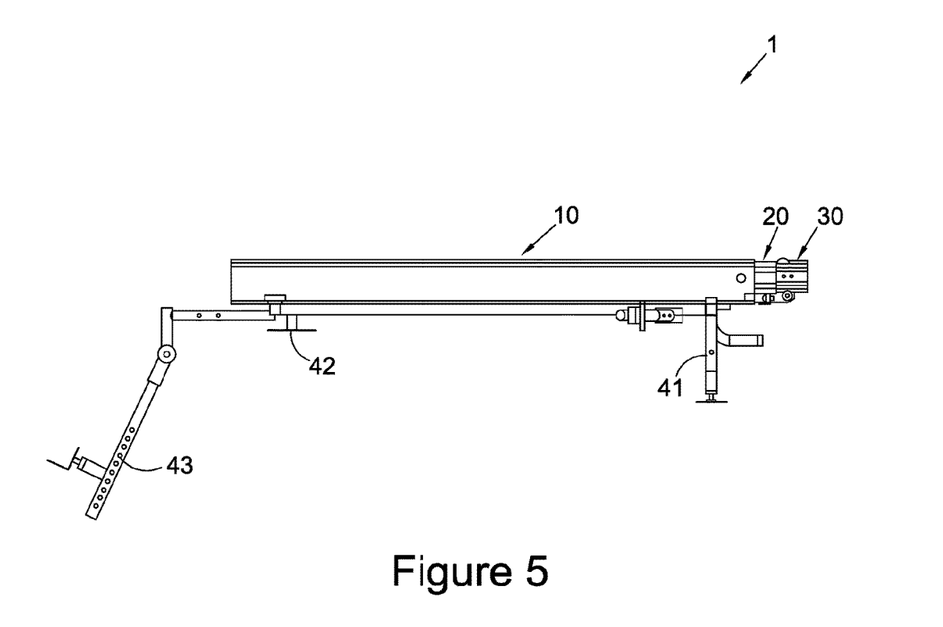
FIG. 5 is a side view of the device of FIG. 4 in a stowed state.

The ramp 30 includes a first ramp portion 31 and second ramp portion 32. The platform 10, bridge 20 and first and second ramp portions 31, 32 are all configured for telescopic movement. The device 1 is shown in a stowed state in FIG. 5. To move between the extended and stowed positions, the ramp portions 31, 32 may be moved such that they are coplanar with the platform 10 and bridge 20 (i.e. the angle between the bridge 20 and ramp portions 31, 32 is zero), and the bridge 20 and ramp 30 is moved telescopically to be stored underneath the platform 10.

In this embodiment, the device 1 includes an indicator 25 disposed between the bridge 20 and the ramp 30. The bridge 20 and ramp 30 are pivotally mounted such that as the angle between the bridge 20 and ramp 30 increases, a greater proportion of the indicator 25 is unveiled. The amount of indicator 25 visible to the user therefore illustrates the angle between the bridge 20 and ramp 30. The indicator 25 includes a section of one colour (e.g. green) when the angle is less than 30 degrees, and, as the angle increases over 30 degrees, a portion of the indicator in a second colour (e.g. red) is unveiled. The skilled person will understand that the indicator 25 is a useful tool to help the user (who may be elderly) determine if the ramp 30 is deployed at a safe angle.

Figure 6:
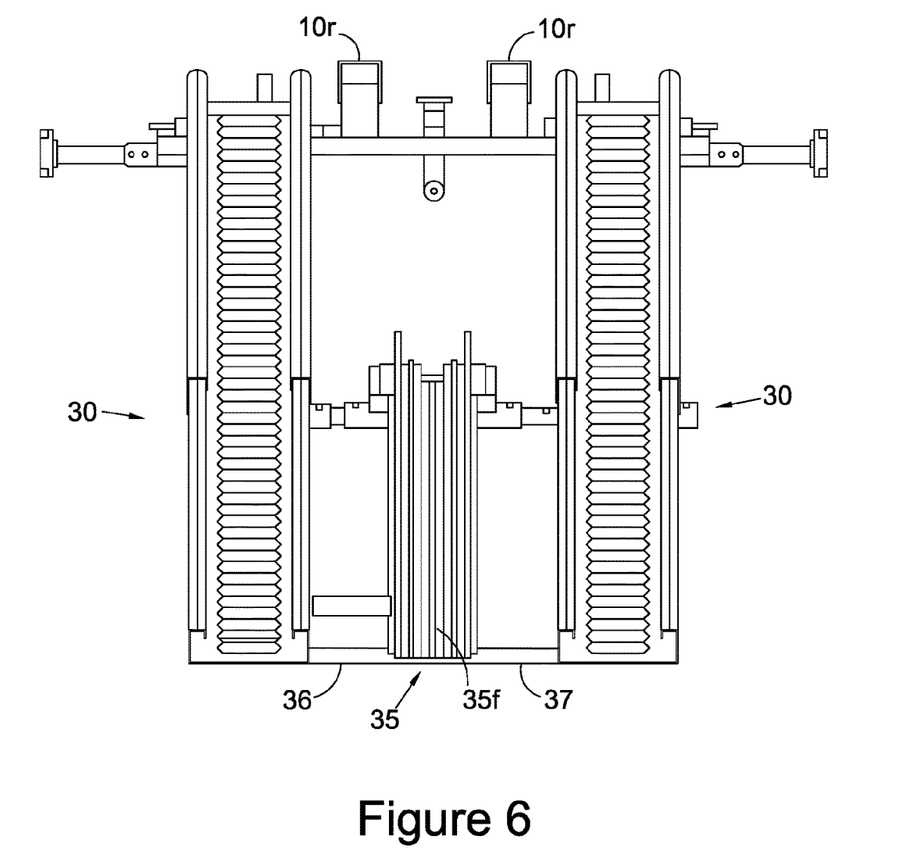
FIG. 6 is a front view of the device of FIG. 4 in the extended state.

FIG. 6 is a front view of the device 1 in the extended position. In this embodiment, the platform 10, bridge 20 and ramp 30 are all provided in left and right sections. These are positioned a distance apart such that the left and right sections align with the left and right wheels of a mobility vehicle.

The device also includes a central channel 35 having a floor 35f. The central channel 35 is positioned between the left and right sections of the platform 30 and is connected thereto by handles 36, 37. The central channel 35 is therefore aligned with a central front wheel of a mobility vehicle (e.g. for 3 or 5 wheeled mobility vehicles). The handles 36, 37 help the user move the device 1 between the stowed and extended positions.

Referring to FIGS. 4 and 6, the platform 10, bridge 20 and ramp 30 each include a floor, 10*f*, 20*f*, 31*f*, 32*f*, and sidewall 10*s*, 20*s*, 31*s*, 32*s*. These features work in conjunction with the mobility vehicle (explained below) to ensure it ascends the ramp safely and effectively. The device 1 also includes a receiver 10*r* acting as a stop when the mobility vehicle is loaded on the platform 10.

Referring back to FIG. 4, the fitting mechanism 40 includes a plurality of floor engaging hook-and-loop fasteners 41, 42, a plurality of side wall engaging suction pads, and a plurality of seat anchors 43. These features ensure that the platform 10 is secured to the larger vehicle, and the bridge 20 and ramp 30 may therefore move relative to the platform and larger vehicle.

An embodiment of a mobility vehicle 50 will now be described with reference to FIGS. 7 to 9. In this embodiment, the mobility vehicle 50 is a mobility scooter having a plurality of front wheels 51, a plurality of rear wheels 52, a guide 53, a foldable steering tiller 54 including a control 55, a foldable seat 56, anti-tip castor wheels 57, and a storage compartment 58 containing, a remote control 59.

The guide 53 includes a guide arm 53*a*, guide wheel 53*b*, lever 53*c* and guide disc 53*d*. Guide arms and guide wheels are provided on both sides of the vehicle 50 (but are operated by a single lever 53*c*), but only one guide will be described for simplicity.

Figure 7:
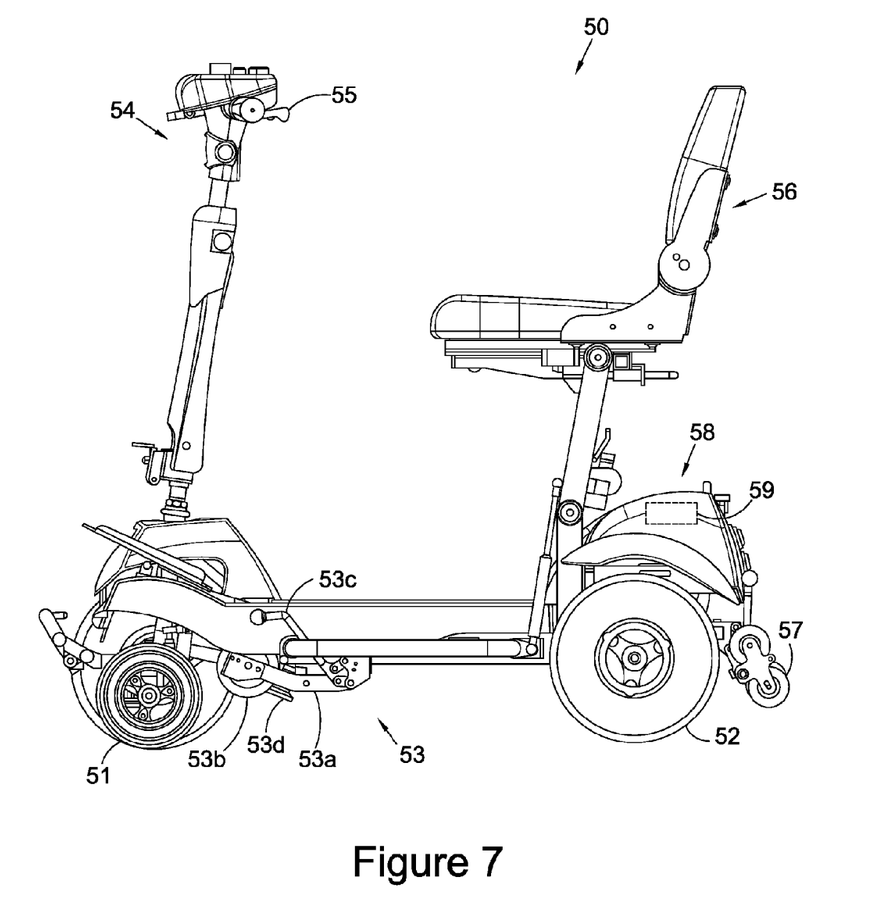
FIG. 7 is a side view of an embodiment of a mobility vehicle of the present invention.

FIG. 7 illustrates the mobility scooter in an arrangement for normal use. The user may sit on the foldable seat 56, steer the vehicle using the steering tiller 54, and control the speed of the vehicle using the control 55. The mobility scooter 50 is driven by the rear wheels 52 and steered via a central front wheel. In this arrangement, the guide is in a disabled state such that it does not interfere with normal operation of the mobility vehicle 50.

Figure 8:
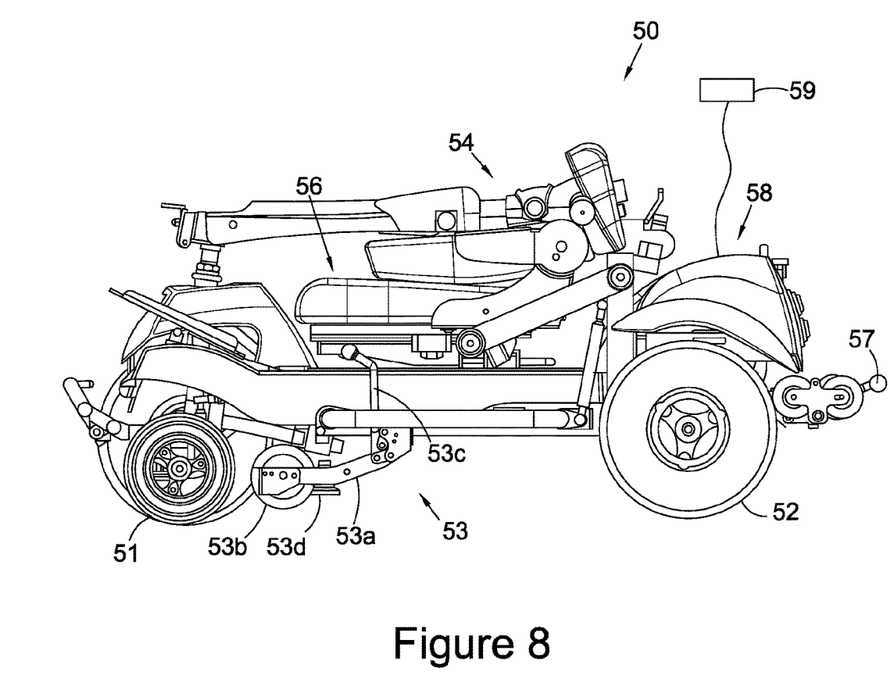
FIG. 8 is a side view of the mobility vehicle of FIG. 7, in a collapsed state.
Figure 9:
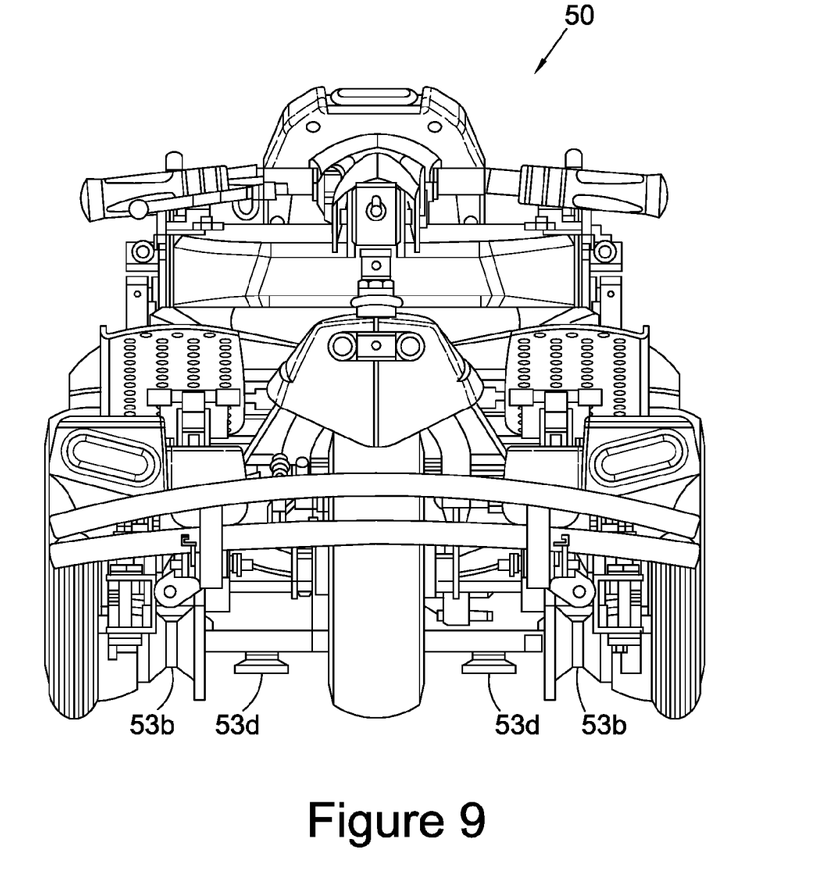
FIG. 9 is a front view of the mobility vehicle of FIG. 7, in the collapsed state.

The mobility scooter 50 has a collapsed state shown in FIG. 8. In this arrangement, the foldable steering tiller 54 and seat 56 are folded into the collapsed state, which reduces the height and effective volume of the scooter 50. The user may operate a lever 53*c* on the guide 53, which causes the guide arm 53*a* to move about a pivot and lower the guide wheel 53*b*. The guide wheel 53*b* therefore moves away from the floor body towards the ground.

When in this lowered state, the guide wheel 53*b* is positioned such it abuts the sidewalls 10*s*, 20*s*, 31*s*, 32*s* of the device 1 as the mobility scooter 50 ascends the ramp. This has the effect of lifting the front portion of the mobility vehicle 50 relative to its rear portion (i.e. increasing the pitch angle), thereby lifting the front wheels 51 away from the floor 10*s*, 20*s*, 30*s* of the device 1 (this is explained in more detail below). As shown in FIG. 9, the guide wheel 53*b* has a grooved section. The grooved section helps the guide wheels 53*b* capture the sidewalls 10*s*, 20*s*, 31*s*, 32*s* of the device 1.

When in the collapsed state, the mobility scooter 50 also raises the anti-tip castor wheels 57. This ensures that the castor wheels 57 do not contact the ramp as it ascends, such that only the guide wheel 53*b* and driven rear wheels 52 contact the device 1.

The mobility scooter 50 is also configured to disable the control 55 when in the collapsed state. The mobility scooter 50 may therefore only be driven by the remote control 59. Accordingly, the user may stand a safe distance away from the scooter and drive it up the ramp using the remote control 59.

An embodiment of a method of loading a mobility vehicle 50 into a larger vehicle will now be described with reference to FIGS. 10 to 13. Firstly, the user opens an opening on a large vehicle (e.g. a boot of a car) and extends the bridge 20 and ramp 30 from the device 1 to the ground. The bridge 20 therefore extends over the boot lip of the car and the ramp 30 extends at an angle of less than 30 degrees to the ground.

The user then drives the mobility vehicle 50 to the device 1 such that the central front wheel aligns with the central channel 35 and the left and right front wheels align with the left and right sections of the ramp 30. The user then steps off the mobility vehicle 50 and folds the steering tiller 54 and seat 56 such that it is in the collapsed state shown in FIG. 10. The mobility vehicle 50 is no longer drivable by the control 55.

Figure 10:
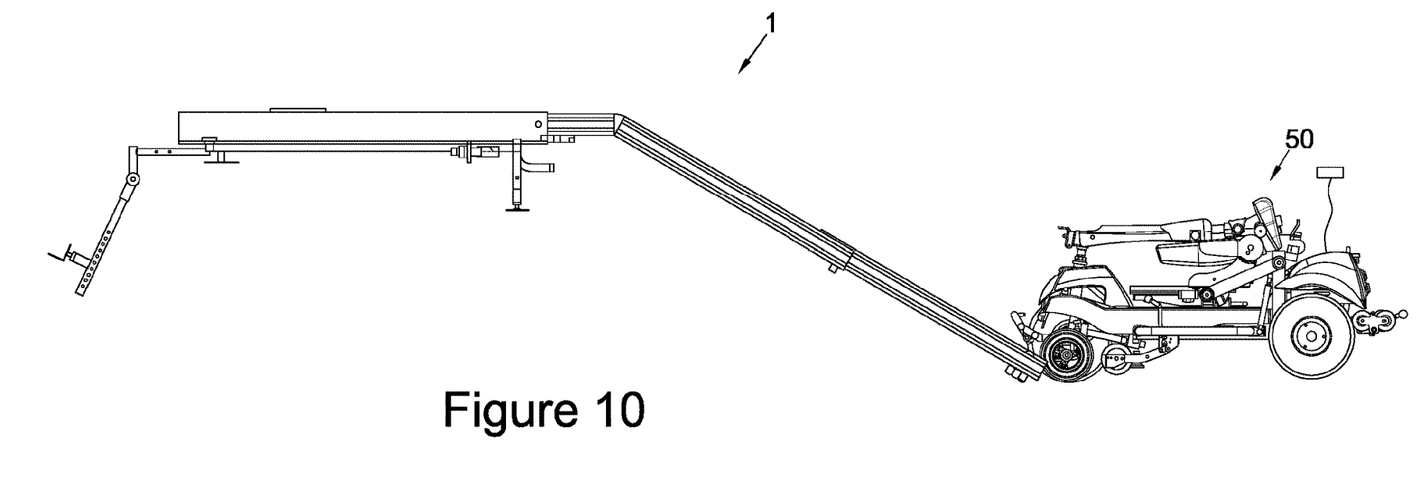
FIGS. 10 to 13 illustrate an embodiment of a method of the present invention.

The user then operates the lever 53*c* to lower the guide wheel 53*b*. This also raises the anti-tip castor wheels 57. The user then removes the remote control 59 from the storage compartment 58 and moves the mobility vehicle 50 forward.

Figure 11:
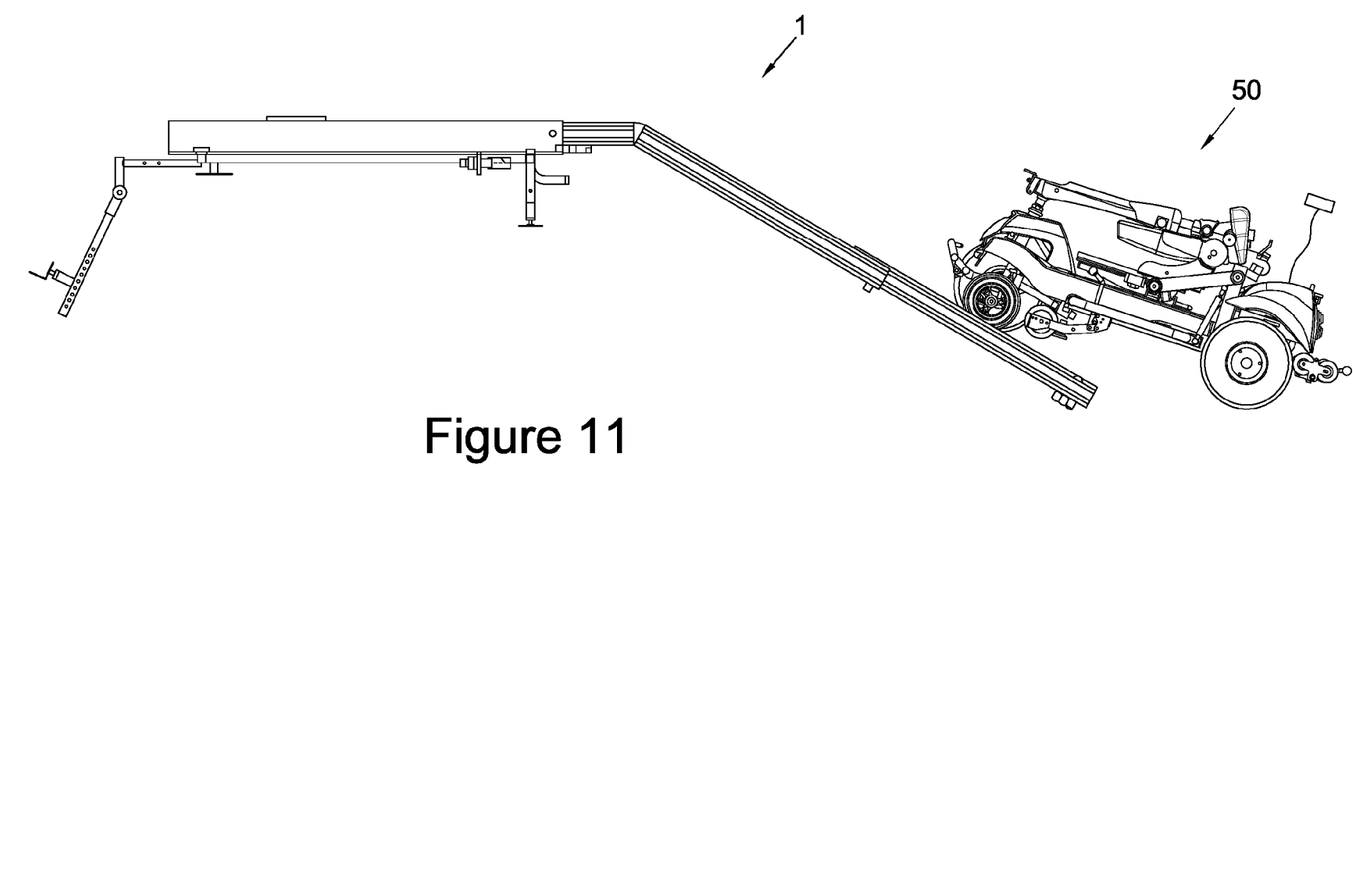
Figure 12:
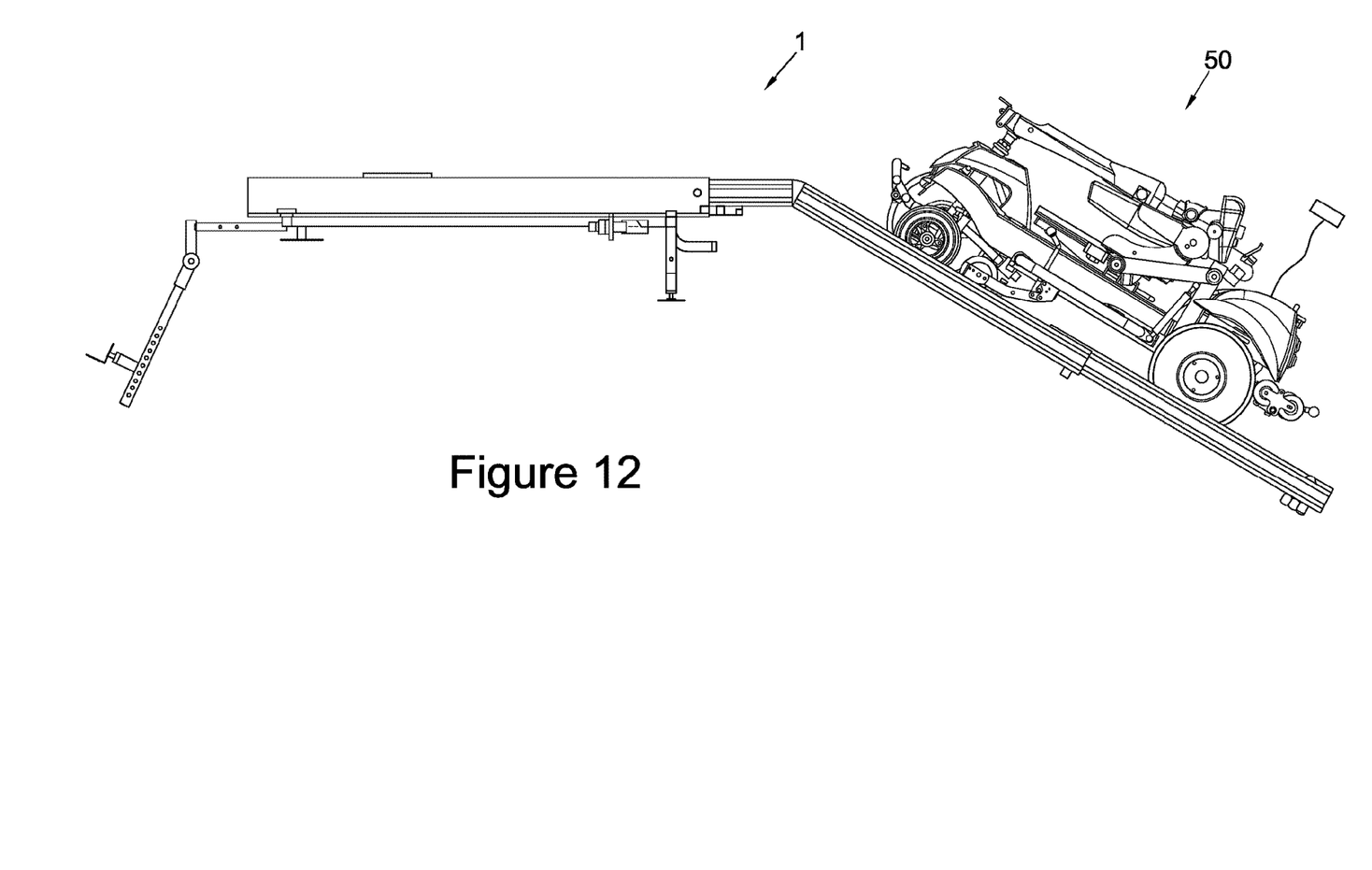

As shown in FIG. 11, the mobility vehicle 50 therefore begins ascending the ramp 30. Initially, the front wheels 51 contact the floor of the ramp 30 and central channel 35. However, as the mobility scooter 50 moves further up the ramp 30, the guide wheels 53 contact the ramp sidewalls 31*s*, 32*s*. This causes the front portion of the mobility vehicle 50 to lift, thus lifting the front wheels 51 off the floor of the ramp 30 and central channel 35 (as shown in FIG. 12). The front wheels 51 therefore cannot influence the steer angle of the mobility vehicle 50, and the mobility vehicle 50 is directed by the guide wheel 53 and sidewalk 31*s* along and up the ramp 30.

The mobility vehicle 50 adopts a particular pitch angle when the guide wheels 53 abut the sidewalls 31*s*, 32*s*. The mobility vehicle 50 retains this pitch angle until the guide wheels 53 move from the ramp sidewalls 31*s*, 32*s* to the bridge sidewalk 20*s*. As the guide wheels 53 are positioned between the front and rear wheels of the mobility vehicle 50, the front portion of the mobility vehicle 50 is therefore lifted over the bridge 20 before the guide wheels 53 contact the bridge sidewalls 20*s* and the pitch angle begins to decrease. This ensures the mobility vehicle 50 does not ground as it ascends the device 1.

Figure 13:
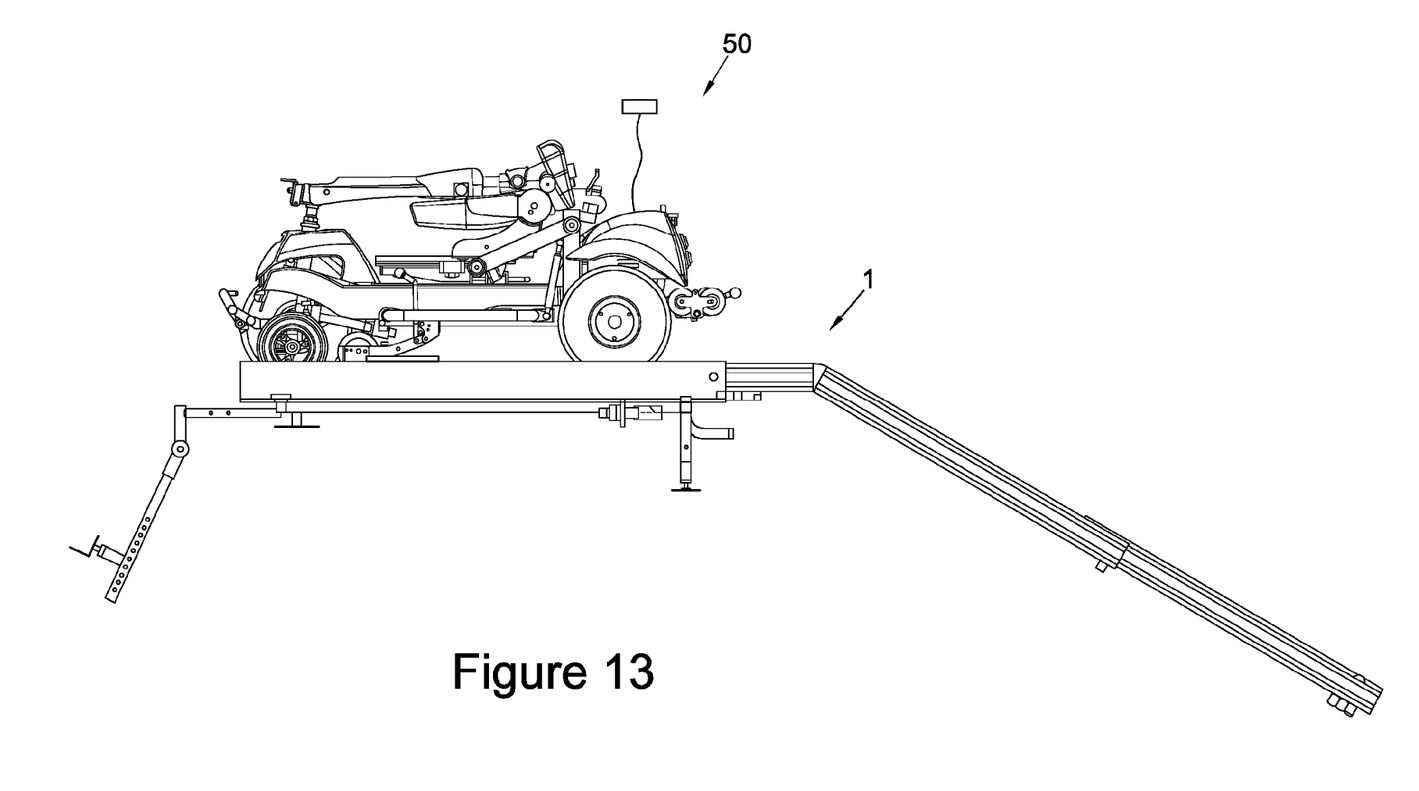

The mobility vehicle 50 continues being driven until it is positioned on the platform 10 as shown in FIG. 13. To prevent any forward motion of the mobility vehicle 50, the guide disc 53*d* enters the receiver 10*r* on the platform 10, and the automatic brakes on the rear wheels 52 prevent any backward motion of mobility vehicle 50.

The user may then move the bridge 20 and ramp 30 to the stowed position and close the boot of the car.

In the embodiment above, the device 1 is constructed out of a plurality of parts having left and right sections (for aligning with the left and right wheels of the mobility vehicle). However, the skilled person will understand that this is non-essential. The device may include a platform, bridging member and ramp each constructed from a single piece of material. The sidewalls may be disposed on the outer edge of the device and mobility vehicle's guide may then be positioned at a corresponding width.

In the description above, the platform, bridging member and ramp all have sidewalls. However, the skilled person will understand that it is not essential for the platform and bridging member to have sidewalls.

The mobility vehicle described above includes a guide movable to a deployed position below the floor of the vehicle and between the front and rear wheels. However, the skilled person will understand that this particular position is not essential. The deployed position and the device's sidewalls are arranged such that the front portion of the mobility vehicle is lifted off the ground, but this may include (for example) the guide being deployed in front of the front wheels of the mobility vehicle. Furthermore, it is not essential for the guide to be a guide wheel.

The skilled person will also understand that it is not essential for the mobility vehicle to be a mobility scooter. The mobility vehicle may be any form of vehicle suitable for transporting an elderly or infirm person, such as a wheelchair.

The skilled person will understand that any combination of features is possible without departing the scope of the invention, as claimed.

The invention claimed is:

1. A system comprising:
   a mobility vehicle; and
   a device for moving the mobility vehicle into a larger vehicle, the device comprising:
      a platform for positioning inside the larger vehicle; and
      a ramp having a sidewall;
   wherein the mobility vehicle comprises:
      a body having a floor, the floor having an upper side and a ground-facing side;
      at least one front wheel and a plurality of rear wheels; and
      a guide attachable to the body and movable away from the floor from a disabled state in which the guide is attached to the body and does not interfere with normal operation of the mobility vehicle to a deployed position on the ground-facing side of the floor below the floor of the mobility vehicle body; and
   wherein the guide and sidewall are arranged such that, as the mobility vehicle ascends the ramp, the front wheels are lifted off the ramp, and the guide steers the mobility vehicle up the ramp and into the larger vehicle;
   wherein the device includes a bridging member connectable between the platform and ramp; and
   wherein the bridging member and ramp are configured to move to a deployed position in which the bridging member extends between the platform and the ramp such that the bridging member and platform are substantially coplanar, and the ramp extends at an angle from the bridging member.

2. The system as claimed in claim 1, wherein the guide is movable away from the floor to a deployed position on the ground-facing side of the floor and between the front and rear wheels.

3. The system as claimed in claim 1, further comprising a steering tiller including a control for driving the front or rear wheels, wherein the control is disabled when the guide is moved away from the floor to the deployed position.

4. The system as claimed in claim 1, further comprising an anti-tip wheel positioned at a rear portion of the mobility vehicle body, wherein the anti-tip wheel is movable.

5. The system as claimed in claim 4, wherein the anti-tip wheel is raised when the guide is moved away from the floor to the deployed position.

6. The system as claimed in claim 1, wherein the guide is a wheel.

* * * * *